Nov. 16, 1943.　　M. S. DUNKELBERGER ET AL　　2,334,613

FISHHOOK

Filed Feb. 14, 1942

Inventors
Milton S. Dunkelberger
and Byron C. Dunkelberger
BY
Henry G. Dubois
ATTORNEY Patented Nov. 16, 1943

2,334,613

UNITED STATES PATENT OFFICE 2,334,613

FISHHOOK

Milton S. Dunkelberger and Byron C. Dunkelberger, Dayton, Ohio, assignors to The American Display Company, Dayton, Ohio, a corporation of Ohio Application February 14, 1942, Serial No. 430,910

6 Claims. (Cl. 43—27)

This invention relates to fish-hooks and the method of making same and more particularly to fish-hooks made from cheap materials fabricated by the use of mass production methods.

An object of this invention is to produce a composite fish-hook from sheet material stampings.

Another object of this invention is to provide a fish-hook from sheet material stampings so that the shank of the hook is substantially rectangular in cross sectional area.

Another object of this invention is to produce a fish-hook from metal stampings wherein the bill is first formed into a chisel edge severed so as to form a barb and a point from the chisel edge.

Another object of this invention is to provide a fish-hook from metal stampings that is tempered after fabrication.

Another object of this invention is to provide a composite fish-hook wherein the members are held together by swaging at least one of the members, so as to cause it to interlock with another member.

Another object of this invention is to join two metallic parts, one of which is provided with a pair of apertures receiving tongues of the other, which tongues are joined by an arcuate portion that is straightened after assembly so as to clamp the members together.

Another object of this invention is to provide a fish-hook that is easily produced from cheap materials and at the same time efficient and dependable.

Other objects and advantages reside in the construction of parts, the combination thereof and the mode of operation, as will become more apparent from the following description.

Figures 6, 7:
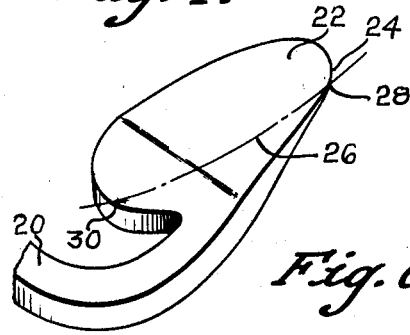
Figure 6 is an enlarged detail view showing the hook portion in the process of manufacture.

Figure 7 discloses a single hook made from a metallic stamping, wherein the hook itself has been made by the process shown in part in Figure 6.

Figure 8:
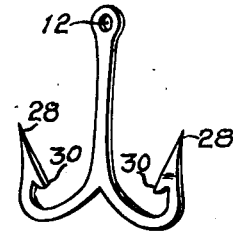

Figure 8 is a double hook made from a stamping, wherein the two hooks have been made by the process shown in Figure 6.

In the past, small fish-hooks have generally been made from wire curved into the proper shape, having a bill including a point and a barb. This has required a special process and relies upon suitable wire being available for the manufacture thereof. It has been discovered that metallic stampings may have extremely sharp edges and points. Furthermore, due to priorities, caused by the defense program, suitable wire for the manufacture of fish-hooks is not available.

The fish-hook disclosed herein is manufactured from metallic stampings formed from sheet metal properly fabricated and heat treated to as to form a suitable fish-hook. When the fish-hook assembly is provided with three or more arms, each provided with a bill having a point and a barb, the fish-hook assembly is preferably made from several members wherein the members are interlocked by a swaging operation on at least one of the members, as will appear more fully from the detailed description that follows.

Referring to the drawing, the reference character 10 indicates the main body portion of the hook. The main body portion 10 is a sheet metal stamping, stamped from a large sheet of metal. The dies are preferably nestled together, so as to economize on sheet metal. The weight of the finished hook depends entirely upon the thickness of the sheet material. If a thick, strong hook is required, the stamping is stamped from a thick sheet of material. For lighter weight hooks, thinner sheet material is used.

Figure 1:
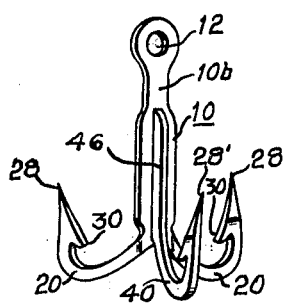
Figure 1 is a perspective view of the preferred embodiment of the fish-hook.
Figure 2:
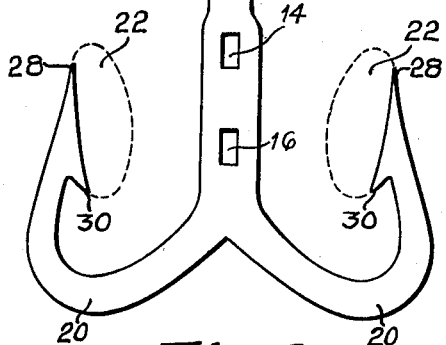
Figure 2 is an enlarged side elevational view of one of the stampings utilized in the manufacture of the hook shown in Figure 1.

One end of the shank of the main body portion 10 is provided with an opening or eye 12 adapted to receive the fish line. The shank is provided with a pair of apertures 14 and 16. In order to provide sufficient strength, the shank is somewhat wider in the vicinity of the apertures than at the neck portion 10b. The lower end of the main body portion 10 is provided with a pair of diverging arms 20, each terminating in a lobular portion 22, shown in dotted lines in Figure 2 and in full lines in Figure 6.

One side of the lobular portion 22 is forged so as to form a chisel-like knife edge 24. This edge is extremely sharp. After the edge 24 has been formed, the lobular portion is severed along the curved line 26 shown in Figure 6, so as to form the bill including a sharp point 28 and a retaining barb 30. This point does not receive any further sharpening operation. By forming the knife edge 24 and severing the lobular portion along the line 26, a sharp point is always formed. The size of the lobular portion 22 is a matter of choice. For the purpose of clearness it has been shown exaggerated in size in the drawing submitted herewith.

Figure 5:
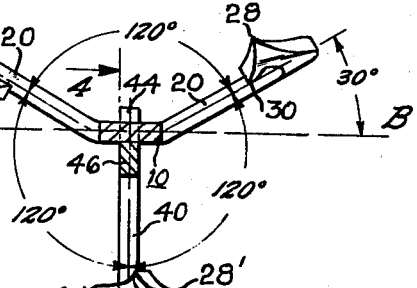
Figure 5 is a cross sectional view taken substantially on the line 5—5 of Figure 4 and line 5—5 of the member shown in Figure 2.

As may best be seen in Figure 5, the arms 20 are deflected from the original plane A—B of the sheet material, so as to form an angle of substantially 120° with respect to each other. The shank portion of the main body 10 remains substantially flat throughout the entire length thereof with the exception of the lower portion which may be slightly curved when bending the arms 20 into proper position.

Figure 3:
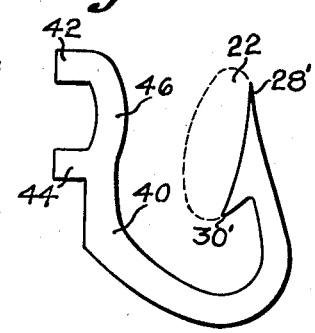
Figure 3 is an enlarged detail view of another stamping used in the manufacture of the hook shown in Figure 1.

A third hook member 40 provided with a bill having a pointed hook 28' and a retaining barb 30' is fixedly attached to the shank of the main body portion 10. This has been accomplished by permanently interlocking the members. In the preferred embodiment this has been accomplished by projecting a pair of tongues 42 and 44 through the apertures 14 and 16, followed by a swaging operation. An arcuate portion 46 extends between the tongues 42 and 44 of the stamping as shown in Figure 3. The distance between the tongues 42 and 44 is substantially equal to the distance between the apertures 14 and 16.

Figure 4:
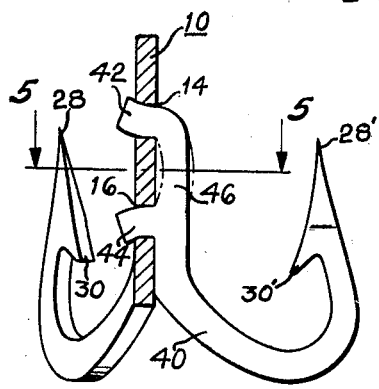
Figure 4 is a cross sectional view taken substantially on the line 4—4 of Figure 5.

After the tongues 42 and 44 have been extended through the apertures 14 and 16 respectively, the arcuate portion 46 is swaged and straightened from the dot-dash position shown in Figure 4 to the full line position. This causes the tongues 42 and 44 to be spread slightly and to be angularly disposed with respect to the straightened portion 46, thereby interlocking member 40 with the main body portion 10. It is unnecessary to upset or rivet the ends of the tongues 42 and 44. Furthermore, it is unnecessary to weld the parts together. By the swaging arrangement, a hook assembly is formed provided with three bills equiangularly disposed. Each bill is preferably deflected from the plane of the supporting arms 20 and 40, as the case may be, as clearly shown in Figure 5, where all of the hooks have been deflected in a counterclockwise direction. This results in a slightly spirally disposed hook arrangement, which is preferred by anglers.

In the preferred embodiment a three prong hook has been shown. In Figure 7 a single prong hook has been shown, made by a process similar to that described in connection with the preferred embodiment described above. In the modification disclosed in Figure 8, a two prong hook has been shown, made from a stamping severed from sheet metal. The points 28 are formed by the process disclosed in Figure 6.

The preferred method of producing the hooks utilizes soft sheet material, such as sheet iron, of a comparatively high carbon content. The carbon content depends entirely upon the process used in treating the material and the desired characteristics of the finished product. After the hooks have been formed and assembled, they are preferably subjected to a suitable heat treatment, as for example, by heating the assembly to a cherry-red temperature, then quenching the hook assembly in oil, resulting in a hard, brittle hook assembly. In order to give the assembly the necessary tensile strength and elasticity, the quenched assembly is reheated so as to give it the desirable blue color. Thereby, the desired temper is attained. Instead of this treatment, the hook assembly may be case-hardened or it may be treated by a cyanide process, so as to give it the desired temper. Any suitable process of tempering the assembly may be used.

It is not absolutely necessary to make the hook disclosed herein from sheet metal. For some purposes it may be molded from a plastic molding material or it may be made in any other suitable manner.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A triple fish-hook including a main body member, said main body member having a shank portion and a pair of oppositely disposed hook portions each including a bill provided with a point and a barb, each of said hook portions deflecting from the plane of the shank portion through an angle of substantially 30°, and a sheet metal hook-shaped member provided with a bill at one end having a point and a barb, the opposite end of the hook-shaped member being fixedly attached to the shank portion of the main body member so as to extend in a plane substantially normal to the plane of the shank portion of the main body member.

2. A fish-hook assembly including a main body, said main body having an apertured shank portion and a pair of oppositely disposed hook portions, each hook portion including a pointed bill provided with a barb, and a hook-shaped member provided with tongues fixedly seated in said apertures in the shank portion to hold the members in rigid relation with respect to each other.

3. A fish-hook assembly including a main body, said main body having a shank portion provided with a pair of apertures, and a hook-shaped member having one end terminating in a pointed bill provided with a barb, the opposite end of the hook-shaped member being provided with a pair of tongues projecting through said pair of apertures, said tongues deflecting so as to rigidly interlock said member to the main body.

4. A fish-hook assembly including a main body member, said main body member having a shank portion and a pair of oppositely disposed hook portions each hook portion including a bill provided with a point and a barb, and a hook-shaped member, one of said members being provided with apertures and the other with tongues projecting into the apertures and fixedly seated therein so as to hold the members in a rigid relation with respect to each other.

5. A fish-hook assembly including a main body member, said main body member having a shank portion provided with apertures therein, a hook portion merging from the shank portion and terminating in a pointed bill provided with a barb, and a hook-shaped member provided with tongues fixedly seated in some of the apertures in the shank portion, said tongues deflecting so as to interlock the members in a rigid relation with respect to each other.

6. A member for use in a composite fish-hook, said member including a pair of tongues, an arcuate portion spanning the distance between the tongues and integral therewith, a straight portion beyond one of the tongues, said straight portion merging into a hook portion terminating in a pointed bill provided with a barb.

MILTON S. DUNKELBERGER.
BYRON C. DUNKELBERGER.